Jan. 16, 1945.  E. H. KRUSE  2,367,588
COMBINED FISH SACK HOLDER AND FISHING POLE REST
Filed Oct. 23, 1943
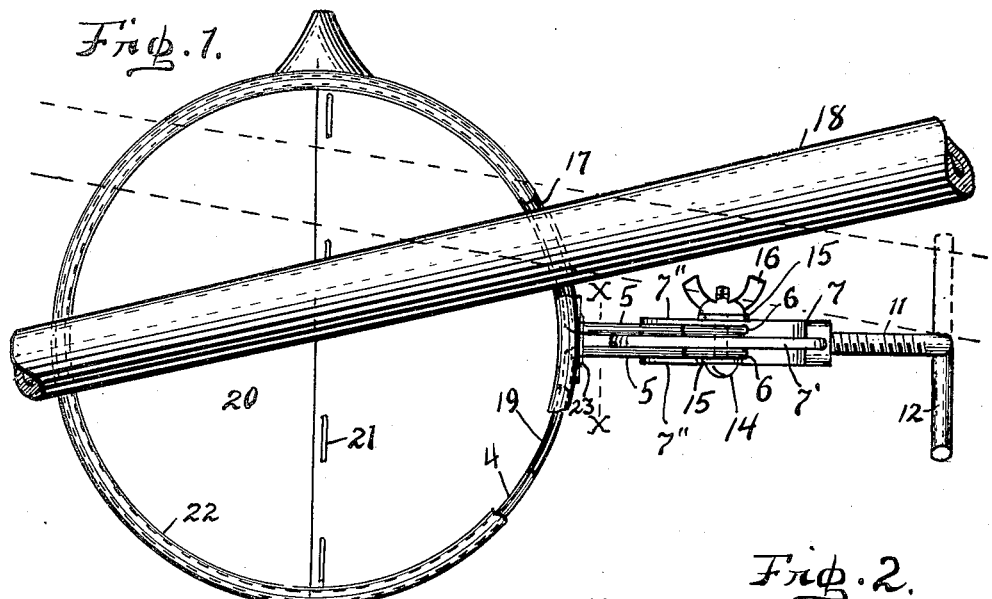
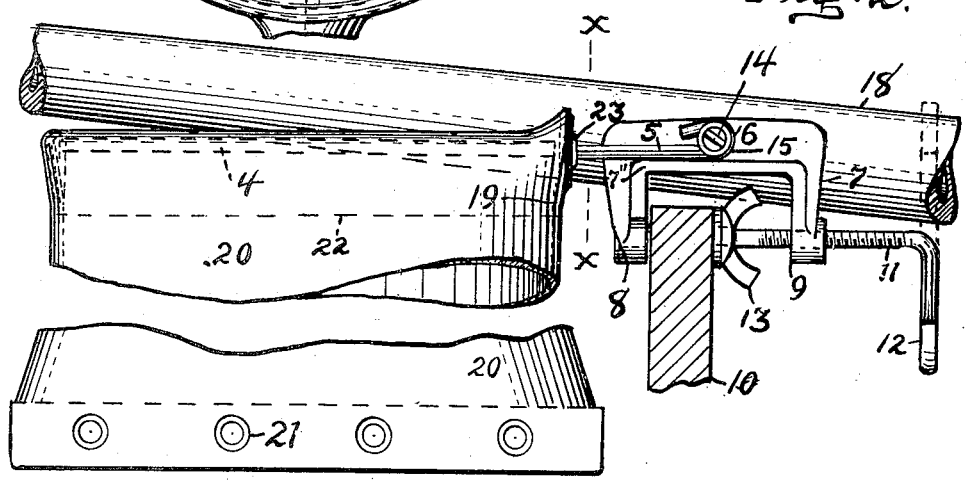
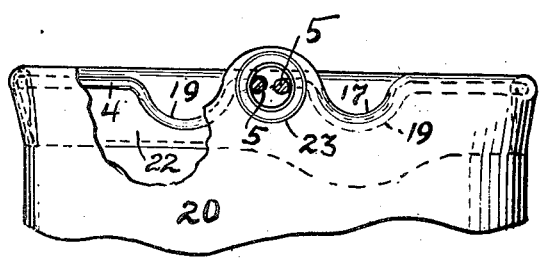
Edward H. Kruse INVENTOR.
BY Patented Jan. 16, 1945

2,367,588

UNITED STATES PATENT OFFICE 2,367,588

COMBINED FISH SACK HOLDER AND FISHING POLE REST

Edward H. Kruse, Fort Wayne, Ind.

Application October 23, 1943, Serial No. 507,384

8 Claims. (Cl. 211—1)

This invention relates to a combined fish sack holder and fishing pole rest adapted to be detachably secured to the gunwale of a boat or other support.

An object of the invention is to afford a frame for suspension of a fish sack while open at its top, and means for conveniently securing the frame detachably to a support, and to form the frame in such manner as to provide a pole rest.

Other objects and advantages of the invention appear in the following description.

An illustrative embodiment of the invention is shown in the accompanying drawing, in which—

Fig. 1 is a top plan view of a structure in which the invention is incorporated, a fragmentary portion of a fish pole being shown in position thereon;

Fig. 2 is a side elevational view of the structure shown in Fig. 1; and

Fig. 3 is a fragmentary rear elevational view of the sack and its holder, a portion being broken away in section on the dotted line x—x in Figs. 1 and 2.

The illustrative embodiment of the invention consists of a circular frame, preferably of wire, shaped to form a sack-supporting loop 4 with outwardly extending parallel arms 5 that terminate with alined eyes 6.

The frame has hinged connection with a clamp 7 provided with jaws 8 and 9 that are spaced apart to receive therebetween the gunwale 10 of a boat. In one of said jaws 9 is disposed a threaded clamp screw 11 provided at its outer end with a pole-engaging hook-shaped operating handle 12. The inner end of the screw has threaded thereon a thumb-nut 13 positioned with its flat face opposed to the other jaw 8 of the clamp. By tightening the thumb-nut against the gunwale the clamp 7 is held firmly in position thereon and the screw is adjustably secured from turning.

The arms 5 are disposed astride the rib 7' of the bracket, and a threaded bolt 14 extends through the eyes 6 and the rib, there being provided washers 15 and a thumb-nut 16 suitably positioned so the arms are clamped securely on the bracket by the bolt.

A feature of the invention is the provision of rests 17 for a fish pole 18, the rests being provided by forming depressions 19 in the wire loop 4, preferably located one adjacent each of the arms 5.

A fish sack 20 is provided that preferably has drain openings 21 in its lower end, and a hem 22 that extends around its upper end portion. The loop 4 is disposed within the hem so as to support the sack. The upper portion of the sack conforms to the depressions 19 made in the loop and thus is plainly indicated the location of the pole rests 17. The arms 5 of the wire frame extend from within the hem 22 through a grommet 23, or other suitable opening made in the upper exterior wall of the sack, and are of any desired length such as to permit the sack to freely clear the bracket when the frame is swung upon the hinge bolt. The lateral sides 7'' of the bracket underlie the arms 5 when in operating position and limit downward hinge movement of the frame.

In operation, the clamp is secured upon the gunwale by turning the screw 11 and tightening the thumb-nut 13. The frame together with the sack are then swung outwardly overboard, whereupon the arms contact with the laterally extending sides of the clamp, and thus the frame with the pendent sack are sustained in operating position. The rib 7' protrudes upwardly between the arms 5 which are clamped tightly against the sides thereof by the bolt 14, and thus is prevented horizontal swaying of the frame or contacting with the boat. By lowering the pole into one of the rests 17 and then turning the operating handle 12 so as to overhang the inner end portion of the pole, as shown in dotted lines in Fig. 2, the pole is sustained in a definite position, and is secured in various selected positions by adjustably manipulating the handle about its axis until the pole is inclined at a desired slant, and then tightening the thumb-nut 13 which thereby binds the screw in place.

Variations from the particular construction above disclosed may readily be made by exercise of engineering skill without departure from the spirit or scope of the invention, and the following claims are intended to be inclusive of such variations.

What I claim is:

1. A combined fish sack holder and pole rest consisting of a clamp provided with means to detachably secure it to a support, said clamp having laterally extending sides and an upwardly extending rib, a frame hingedly secured to said clamp, shaped to provide a sack-supporting loop having outwardly extending arms disposed astride said rib, said loop having a depression made therein to provide a pole rest, a sack the upper portion of which is secured to said loop and conforms to said depression, and means to secure said arms tightly against said rib when the frame is in operating position.

2. In a combined fish sack holder and pole rest including a clamp provided with means to secure it to a support, a frame secured to said clamp having limited hinge movement thereon and provided with means to secure the frame in a selected position relative to said clamp, said frame being shaped to provide a sack-supporting loop with a depression formed therein constituting a pole rest, and a fish sack the upper portion of which is secured to said loop and conforms to said depression.

3. In a combined fish sack holder and pole rest, a clamp having means to detachably secure it to a support, a wire frame shaped to provide a sack-supporting loop and outwardly extending arms, said loop having a depressed portion constituting a pole rest, said arms being hingedly secured to said clamp and having limited movement relative thereto, and means to sustain said frame in a selected position relative to said clamp.

4. In a combined fish sack holder and pole rest, a sack-supporting frame provided with a hinged clamp for securing it on a support, and means in connection with the frame and clamp to secure same in selected relative positions, said frame having formed therein a depression to provide a pole rest.

5. In a combined fish sack holder and pole rest, a sack holding frame having a depression made therein constituting a pole rest, a clamp hingedly connected with the frame, and means on said clamp to sustain the frame in a selected position thereon.

6. In a combined fish sack holder and pole rest, a frame, a supporting clamp hingedly connected with said frame provided with means thereon to limit movement thereof, said frame being shaped to provide a sack-supporting loop having a depression formed therein to afford a pole rest, and a sack having an open upper end portion provided with a hem in which said loop is disposed to support the sack and which conforms to said loop including said depression.

7. A holder for a fish sack and fish pole, said holder consisting of a sack-supporting frame having a pole-rest, a clamp connected with the frame provided with a clamp screw to secure the clamp on a support therefor, said clamp screw having a hook-shaped operating handle, the arrangement being such that a pole when disposed in said pole rest and engaged by said handle is held in a selected position, and means to secure said clamp screw in adjusted positions.

8. A holder for a fish sack and fish pole, said holder consisting of a sack-supporting frame having a pole-rest, and a clamp connected with the frame provided with a clamp screw to secure the clamp on a support therefor, said clamp screw having a hook-shaped operating handle, the arrangement being such that a pole when disposed in said pole-rest and engaged by said handle is held in a selected position.

EDWARD H. KRUSE.